United States Patent
Oswald et al.

[19]

[11] Patent Number: 5,837,399
[45] Date of Patent: Nov. 17, 1998

[54] THROUGH-WALL ELECTRICAL TERMINAL AND ENERGY STORAGE CELL UTILIZING THE TERMINAL

[75] Inventors: Walter R. Oswald, Huntington Beach; Robert K. Taenaka, Granada Hills, both of Calif.

[73] Assignee: Hughes Electronics Corporation, Los Angeles, Calif.

[21] Appl. No.: 898,412

[22] Filed: Jul. 22, 1997

[51] Int. Cl.$^6$ ........................................... H01M 2/30
[52] U.S. Cl. ........................ 429/178; 429/181; 429/101
[58] Field of Search .................. 429/178, 179, 429/181, 183, 101, 185; 439/737, 738, 739

[56] References Cited

U.S. PATENT DOCUMENTS

| | | |
|---|---|---|
| 4,000,350 | 12/1976 | Wittmann . |
| 4,250,235 | 2/1981 | DuPont et al. . |
| 4,262,061 | 4/1981 | Rogers . |
| 4,283,844 | 8/1981 | Milden et al. . |
| 4,369,212 | 1/1983 | Rogers et al. . |
| 4,420,545 | 12/1983 | Meyer et al. ............................ 429/101 |
| 4,530,551 | 7/1985 | Benasutti ................................ 439/738 |
| 4,683,178 | 7/1987 | Stadnick et al. . |
| 5,208,118 | 5/1993 | Richardson .............................. 429/101 |
| 5,273,844 | 12/1993 | Casale et al. ............................ 429/178 |
| 5,735,913 | 4/1998 | Borthomieu ............................. 429/101 |

*Primary Examiner*—Anthony Skapars
*Attorney, Agent, or Firm*—Elizabeth E. Leitereg; Terje Gudmestad; Michael W. Sales

[57] ABSTRACT

An electrical terminal provides an electrical interconnection between the exterior and the interior of the pressure vessel of an energy storage cell. The terminal includes an external electrical conductor exterior to the pressure vessel and an internal electrical conductor within the interior of the pressure vessel. An electrically nonconductive support mounts the electrical conductors to the wall of the pressure vessel. The two electrical conductors are cooperatively engaged, preferably by matching threads. A compliant seal is positioned between the external electrical conductor and the internal electrical conductor, on the one hand, and the wall of the pressure vessel, on the other, and a biasing washer set applies a force between the seal and the electrical conductors to maintain hermeticity in the event that the seal deforms during service.

16 Claims, 2 Drawing Sheets

THROUGH-WALL ELECTRICAL TERMINAL AND ENERGY STORAGE CELL UTILIZING THE TERMINAL

BACKGROUND OF THE INVENTION

This invention relates to energy storage cells such as pressurized gas energy storage cells of the nickel-hydrogen type, and, more particularly, to the electrical terminals used in such storage cells.

Rechargeable cells or batteries are electrochemical energy storage devices for storing and retaining an electrical charge and later delivering that charge as useful power. Familiar examples of the rechargeable energy storage cell are the lead-acid cell used in automobiles, and the nickel-cadmium cell used in various portable electronic devices. Another type of energy storage cell having a greater storage capacity for its weight is the nickel oxide/pressurized hydrogen energy storage cell, an important type of which is commonly called the nickel-hydrogen energy storage cell and is used in spacecraft applications. The weight of the spacecraft energy storage cell must be minimized while achieving the required performance level, due to the cost of lifting weight to earth orbit and beyond.

The nickel-hydrogen energy storage cell includes a series of active plate sets which store an electrical charge electrochemically and later deliver that charge as a useful current. The active plate sets are packaged within a hermetic pressure vessel that contains the plate sets and the hydrogen gas that is an essential active component of the energy storage cell. Each plate set includes a positive electrode, a negative electrode, and a separator between the two electrodes, all soaked with an electrolyte. In a typical energy storage cell, a number of plate sets are supported on a core under a compressive loading, with a gas screen between each plate set and with electrical connector leads extending to each electrode of each plate set. The gas screen provides a gas channel from the hydrogen electrode to the gas space outside the stack. A single nickel-hydrogen energy storage cell delivers current at about 1.3 volts, and a number of the energy storage cells are usually electrically interconnected in series to produce current at the voltage required by the systems of the spacecraft.

Electrical current is delivered from the exterior of the energy storage cell to the plate sets during charging, and delivered from the plate sets to the exterior of the energy storage cell during discharging. The electrical current is carried between the exterior and the interior of the pressure vessel by an electrically conductive terminal. In the past, the terminal has been essentially a solid rod of electrically conductive metal mounted to an aperture in the wall of the pressure vessel by an electrically insulating mounting. The conductive rod must be made of a material that is not extensively corroded by the electrolyte during long-term exposure. Existing terminals extend a distance into the interior of the pressure vessel, reducing the space available for plate sets within the pressure vessel, and they are heavier than necessary.

There is a need for an improved approach to the terminal structure used in energy storage cells of the pressurized gas type. The present invention fulfills this need, and further provides related advantages.

SUMMARY OF THE INVENTION

The present invention provides an electrical terminal and an energy storage cell utilizing that terminal. The terminal passes electrical current through a wall of a pressure vessel used in pressurized-gas energy storage cells. The terminal allows optimum combinations of materials to be used in its construction, and is also hermetic and resistant to loss of hermeticity due to changes in the properties of seals over time. The terminal extends into the interior of the pressure vessel a shorter distance than prior designs, leaving more room for the plate sets that store the electrical charge.

In accordance with the invention, an energy storage cell comprises a pressure vessel having a wall with an aperture therethrough, and a vessel interior within the wall. The energy storage cell further comprises at least one plate set within the vessel interior. Each plate set comprises a positive electrode and a negative electrode. An internal electrical lead is connected at a first end to a first one of the electrodes. There is a hermetic electrical terminal extending through the aperture in the wall of the pressure vessel. The hermetic electrical terminal comprises an external electrical conductor exterior to the pressure vessel, and an internal electrical conductor within the interior of the pressure vessel. A second end of the internal electrical lead is connected to the internal electrical conductor. An electrically nonconductive mounting support mounts at least one of the internal electrical conductor and the external electrical conductor to the wall of the pressure vessel and electrically insulates the internal electrical conductor and the external electrical conductor from the wall of the pressure vessel. There is a means for engaging the external electrical conductor to the internal electrical conductor. The means for engaging includes a cooperative engagement having a first element on the external electrical conductor and a second element on the second electrical conductor, a seal between the external electrical conductor and the internal electrical conductor, on the one hand, and the wall of the pressure vessel, on the other, and means for applying a biasing force between the seal and at least one of the external electrical conductor and the internal electrical conductor.

In a preferred form, the electrical terminal comprises an external electrical conductor exterior to the pressure vessel, which includes an external conductor body having a first threaded engagement at a first end, and an external shoulder facing the first threaded engagement at a location adjacent to the first threaded engagement. The terminal also has an internal electrical conductor within the interior of the pressure vessel, which includes an internal conductor body having a second threaded engagement at a first end, such that the second threaded engagement is engagable to the first threaded engagement, and an internal shoulder facing the external electrical conductor at a location adjacent to the second threaded engagement. There is a mounting structure, comprising a biasing washer overlying the external conductor body and contacting the external shoulder of the external conductor body, a first electrically insulating washer overlying the external conductor body and disposed between the biasing washer and the wall of the pressure vessel, and a second electrically insulating washer overlying the internal conductor body and disposed between the internal shoulder and the wall of the pressure vessel. The biasing washer is preferably a Belleville washer set.

This approach wherein the terminal has an internal and an external electrical conductor allows the internal conductor to be made of a material resistant to corrosive attack by the electrolyte of the storage cell. In a one-piece electrical conductor design, the entire conductor must be made of the corrosion-resistant material. Additionally, the preferred design provides compensation for dimensional changes in the seals over time. The energy storage cells in spacecraft are designed to orbital lives of many years, during which maintenance is not possible. In a conventional cell, if the hermetic seals change dimension so as to lose their sealing effect, the energy storage cell will be lost. In the present design, the biasing washers retain the sealing pressure even as the seals change over time, ensuring that the seal is maintained.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
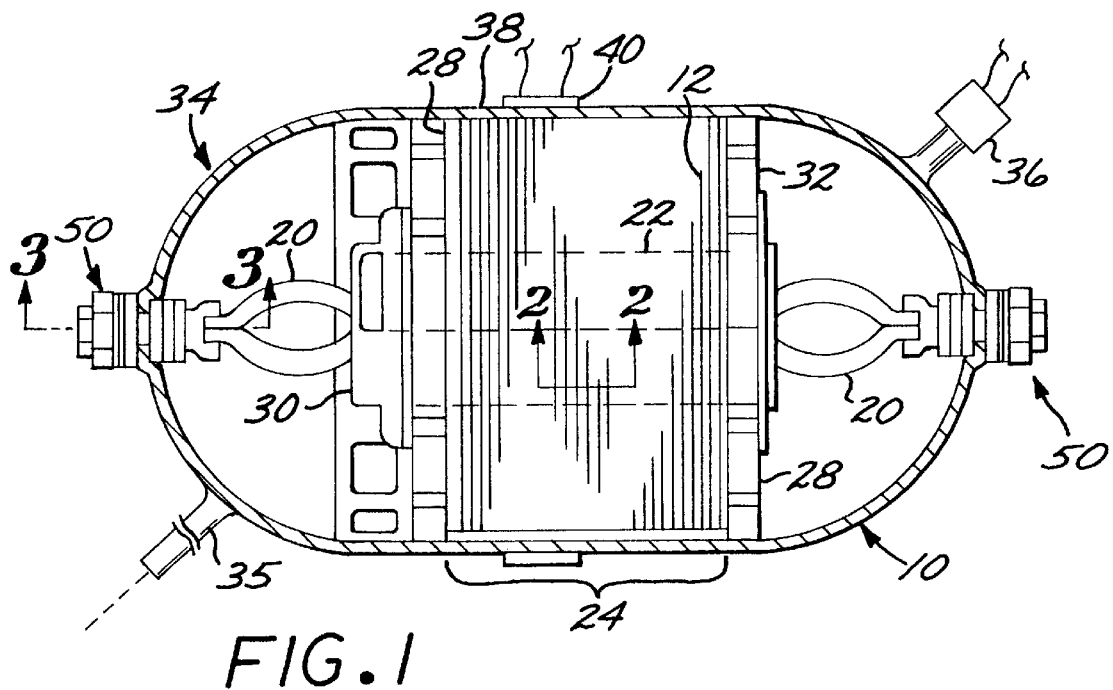
FIG. 1 is a sectional elevational view of a flight-type nickel-hydrogen energy storage cell.
Figure 2:
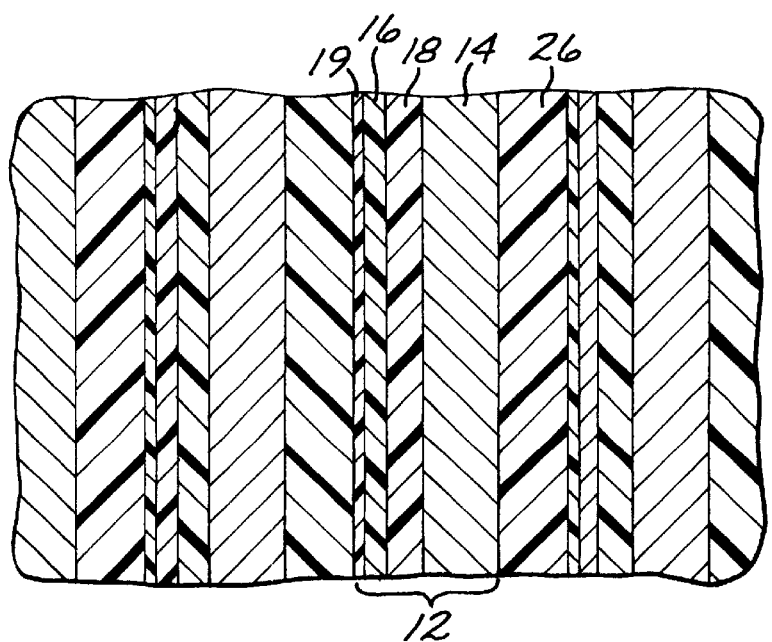
FIG. 2 is an enlargement of a detail of FIG. 1, taken generally on line 2—2 and illustrating the plate sets.

The present invention is preferably used in conjunction with a nickel-hydrogen energy storage cell 10, as illustrated in FIGS. 1–2, of the pressurized gas-metal cell type. Such a storage cell 10 typically comprises a plurality of individual plate sets 12. Each plate set in turn comprises an anode or positive electrode 14, a cathode or negative electrode 16, and an electrolyte-containing separator 18, which physically separates the electrodes 14 and 16 and also supplies the electrolyte medium through which ionic and electron charge transfer. Charging and discharging of the electrodes 14 and 16 are accomplished through respective electrical leads 20.

Various constructions of nickel-hydrogen cells and components are disclosed in the following US Patents, whose disclosures are herein incorporated by reference: U.S. Pat. Nos. 4,683,178; 4,369,212; 4,283,844; 4,262,061; 4,250,235; 4,000,350; and 3,669,744.

The positive electrode 14 is formed by impregnating nickel hydroxide into porous sintered nickel that is supported on an etched nickel electrode substrate. The negative electrode 16 is coated on one side by a sintered mixture of platinum black and polytetrafluoroethylene and on the other side with a porous layer 19 of polytetrafluoroethylene. These layers are applied to a nickel substrate in the form of etched sheet or a woven mesh, to form the negative electrode 16. Many different types of separators 18 have been used, including, for example, asbestos, nylon, and a cloth of zirconium oxide-yttrium oxide. The electrolyte, preferably an aqueous solution containing 26–31 percent by weight concentration of potassium hydroxide, is impregnated into the separator 18, and thence reaches the electrodes 14 and 16.

The individual plate sets 12 are assembled onto a central core 22 to form a stacked array 24. A monofilament polypropylene screen 26 is positioned between each plate set 12 during assembly, so that oxygen liberated during overcharging at each positive electrode 14 can diffuse away from the electrode 14 and to the negative electrode 16 to combine with hydrogen. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer set 32 against the compression plate 28 to hold the stacked array 24 in place.

The stacked array 24 is contained within a hermetically sealed pressure vessel 34 having a wall 38 manufactured of a first material such as Inconel 718 nickel-base alloy which can withstand internal pressures on the order of 1,000 psia, without damage by hydrogen embrittlement. The first material has a relatively low diffusion coefficient of hydrogen therethrough, so that hydrogen is contained within the interior of the pressure vessel 34. A gas fill tube 35 allows gas content and pressure within the pressure vessel 34 to be controlled initially. The gas fill tube 35 is sealed after the initial charging procedures. The pressure vessel 34 is typically constructed in the form of a cylindrical tube having domed ends. By way of illustration, the cell 10 having the pressure vessel 34 of external dimensions of 3-½ to 5-½ inches in diameter by 13–15 inches long contains about 40–100 individual plate sets 12, with a resulting electrical storage capacity of the cell of about 50 to about 350 ampere-hours. The cell 10 may be charged and discharged through thousands of cycles without apparent damage, if the charging and discharging are accomplished properly. A number of cells 10 are ordinarily combined in series or parallel arrangements as a battery.

The pressure within the pressure vessel 34 may optionally be monitored by any operable technique. One such pressure-monitoring device is a pressure gauge 36 communicating with the interior of the pressure vessel, which measures interior pressure directly. Another pressure-monitoring device is a strain gage 40 mounted to the exterior of the wall 38 of the pressure vessel 34. The deformation of the wall 38, as measured by the strain gage 40, is a function of the internal pressure within the pressure vessel 34, which functional dependence is determined in initial calibration testing. The strain gage 40 approach to pressure measurement is preferred, inasmuch as the strain gage is lighter than the pressure gauge and does not require a physical penetration into the interior of the pressure vessel that would potentially be a failure point.

The electrical leads 20 pass from the interior of the pressure vessel 34 to its exterior through electrical terminals 50. Typically, there are two such terminals, one connected to the positive electrodes 14 and extending from one end of the pressure vessel 34, and the other connected to the negative electrodes 16 and extending from the other end of the pressure vessel 34. One of the terminals 50 is preferably affixed to the center of the dome at each end of the pressure vessel 34.

Figure 3:
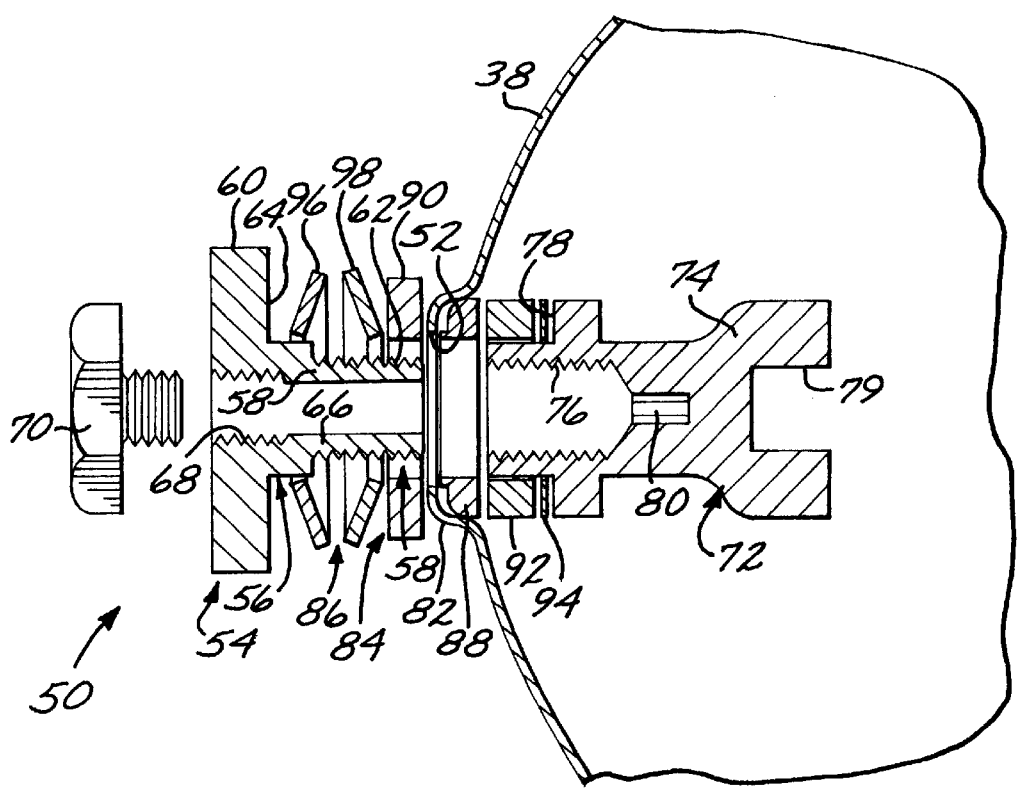
FIG. 3 is a sectional, partially exploded view of one of the electrical terminals of the energy storage cell of FIG. 1, taken on lines 3—3.

FIG. 3 illustrates one of the electrical terminals 50, mounted in an aperture 52 in the wall 38, at the apex of one of the domed ends, in greater detail. The electrical terminal 50 includes an external electrical conductor 54 exterior to the pressure vessel 34. The external electrical conductor 54 includes an external conductor body 56 having the form of a generally cylindrical rod 58 with a first threaded engagement at one end and a head 60 at the other end. The first threaded engagement in the preferred case is an external (male) thread 62 on the outside of the rod 58 of the conductor body 56. The rod 58 and the head 60 together define an external shoulder 64 that faces toward the portion of the rod 58 having the external thread 62. In the preferred form of the invention, the rod 58 and head 60 have an access bore 66 therethrough along the centerline of the rod 58. The access bore 66 is internally threaded with threads 68 along a portion of its length that is within the head 60. A threaded cap screw 70 has external threads that are engagable to the internal threads 68. An external electrical wire conductor (not shown) is attached to the terminal using the cap screw 70, or it may be attached by soldering, welding, or other techniques. A second function of the access bore 66 will be discussed in more detail subsequently.

The electrical terminal 50 includes an internal electrical conductor 72 that is positioned within the interior of the pressure vessel 34. The internal electrical conductor 72 includes an internal conductor body 74 that is generally cylindrical but has a number of surface features. A second threaded engagement on the internal conductor body 74 is threadably engagable to the first threaded engagement of the external electrical conductor 54. In the illustrated preferred embodiment, the second threaded engagement is an internal (female) thread 76 along the axis of the internal conductor body 74. Adjacent to the internal thread 76 but on the outer surface of the internal conductor body 74 is a ring that defines an internal shoulder 78 that faces toward the external electrical conductor 54. At the opposite end of the internal conductor body 74 from the internal thread 76 is a connector region 79 for connecting the electrical leads 20. In the preferred case, the connector region 79 is a slot or recess into which the leads are received and soldered.

A wrench engagement 80 is desirably positioned at the end of the internal thread 76, along the cylindrical axis of the internal conductor body 74. The wrench engagement 80 is used during installation of the terminal 50. The internal electrical conductor 72 and its associated structure are held in place, and the external electrical conductor 54 and its associated structure are screwed into the internal electrical conductor 72. After the conductors 54 and 72 are tightened by hand (and without the cap screw 70 in place), a wrench is inserted into the access bore 66 to engage the wrench engagement 80. The wrench prevents the internal electrical conductor 72 from turning, and the external electrical conductor 54 is tightened with an end wrench applied to flats on the sides of the head 60. The external electrical wire conductor is held in position, the cap screw 70 is installed, and the cap screw is tightened.

The external electrical conductor 54 and the internal electrical conductor 72 are mounted to the aperture 52 in the wall 38 of the pressure vessel 34. The aperture 52 is preferably provided with an outwardly curled lip 82 that aids in the mounting. The mounting structure includes a seal set 84, with seals positioned outside and inside the wall 38 of the pressure vessel 34, and a biasing washer arrangement 86 lying outside the wall of the pressure vessel.

The seal set 84 includes a seal ring 88 that fits within the interior side of the lip 82. An electrically insulating load-bearing washer 90 is positioned immediately outside the lip 82, and two electrically insulating internal washers 92 and 94 are positioned between the seal ring 88 and the internal shoulder 78.

A biasing means is positioned between the external shoulder 64 and the load-bearing washer 90. The biasing means is preferably a pair of Belleville washers 96 and 98, arranged with their concave surfaces in a facing relationship.

When the external electrical conductor 54 is screwed into the internal electrical conductor 72 by the tightening of the thread 62 into the thread 76, the Belleville washers 96 and 98 are compressed against each other, applying a biasing force that is transmitted through the washer 90, the seal ring 88, and the washers 92 and 94. If at a later time there is compressive creep in any of the elements 90, 88, 92, or 94, the reduction in thickness is compensated for by relaxation and widening of the Belleville washers 96 and 98. A continuous sealing pressure is thereby maintained through the elements 90, 88, 92, and 94.

The external conductor body 56 and the cap screw 70 are preferably made of a good electrical conductor material such as aluminum, silver-plated brass, beryllium, magnesium, or their alloys. The external conductor body 56 and the cap screw 70 need not be made of a material that is resistant to corrosion in the electrolyte of the storage cell, inasmuch as it is fully sealed against contact with the electrolyte. The internal conductor body 74 is made of a material that is a reasonably good electrical conductor but is also resistant to corrosion in the electrolyte. The preferred material for the internal conductor body is nickel, preferably pure nickel. The seal ring 88 is preferably made of polytetrafluoroethylene. The washer 90 is preferably made of stainless steel, and the washers 92 and 94 are preferably made of a ceramic such as aluminum oxide. The Belleville washers are made of steel.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An energy storage cell, comprising:
   a pressure vessel having a wall with an aperture therethrough, and a vessel interior within the wall;
   at least one plate set within the vessel interior, each plate set comprising a positive electrode and a negative electrode;
   an internal electrical lead connected at a first end to a first one of the electrodes; and
   a hermetic electrical terminal extending through the aperture in the wall of the pressure vessel, the hermetic electrical terminal comprising:
   an external electrical conductor exterior to the pressure vessel,
   an internal electrical conductor within the interior of the pressure vessel, the internal electrical conductor having a second end of the internal electrical lead connected thereto,
   an electrically nonconductive mounting support that mounts at least one of the internal electrical conductor and the external electrical conductor to the wall of the pressure vessel and electrically insulates the internal electrical conductor and the external electrical conductor from the wall of the pressure vessel, and
   means for engaging the external electrical conductor to the internal electrical conductor, the means for engaging including
   a cooperative engagement having a first element on the external electrical conductor and a second element on the second electrical conductor,
   a seal between the external electrical conductor and the internal electrical conductor, on the one hand, and the wall of the pressure vessel, on the other, and
   means for applying a biasing force between the seal and at least one of the external electrical conductor and the internal electrical conductor.

2. The energy storage cell of claim 1, wherein the cooperative engagement includes a threaded engagement between the external electrical conductor and the internal electrical conductor, comprising a first threaded region on the external electrical conductor, and a cooperative mating second threaded region on the internal electrical conductor.

3. The energy storage cell of claim 2, further including means for holding the internal electrical conductor stationary when the external electrical conductor is turned on the threaded engagement.

4. The energy storage cell of claim 1, wherein the means for applying a biasing force includes a Belleville washer set structurally disposed between the first element and the second element.

5. The energy storage cell of claim 1, wherein the external electrical conductor is made of a first electrically conductive material and the second electrical conductor is made of a second electrically conductive material.

6. The energy storage cell of claim 1, further including means for connecting an external electrical lead to the external electrical conductor.

7. The energy storage cell of claim 1, further including a second internal electrical lead connected at a first end to a second one of the electrodes; and a second hermetic electrical terminal in the wall of the pressure vessel, the second hermetic electrical terminal having a second end of the second internal electrical lead connected thereto.

8. An energy storage cell, comprising:

a pressure vessel having a wall with an aperture therethrough, and a vessel interior within the wall;

at least one plate set within the vessel interior, each plate set comprising a positive electrode and a negative electrode;

an internal electrical lead connected at a first end to a first one of the electrodes; and a hermetic electrical terminal extending through the aperture in the wall of the pressure vessel, the hermetic electrical terminal comprising:

an external electrical conductor exterior to the pressure vessel, the external electrical conductor comprising an external conductor body having a first threaded engagement at a first end, and an external shoulder facing the first threaded engagement at a location adjacent to the first threaded engagement, an internal electrical conductor within the interior of the pressure vessel, the internal electrical conductor comprising an internal conductor body having a second threaded engagement at a first end, the second threaded engagement being engagable to the first threaded engagement, an internal shoulder facing the external electrical conductor at a location adjacent to the second threaded engagement, and a mounting structure, comprising a biasing washer overlying the external conductor body and contacting the external shoulder of the external conductor body, a first electrically insulating washer overlying the external conductor body and disposed between the biasing washer and the exterior of the wall of the pressure vessel, a seal ring in contact with the interior of the wall of the pressure vessel, and a second electrically insulating washer overlying the internal conductor body and disposed between the internal shoulder and the seal ring.

9. The energy storage cell of claim 8, further including means for holding the internal electrical conductor body when the first threaded engagement is turned relative to the second threaded engagement.

10. The energy storage cell of claim 9, wherein the means for holding comprises an access bore through the external conductor body, and a wrench engagement in the internal conductor body, the wrench engagement being aligned with the access bore.

11. The energy storage cell of claim 8, wherein the biasing washer includes a Belleville washer set.

12. The energy storage cell of claim 8, wherein the external conductor body is made of a first electrically conductive material and the internal conductor body is made of a second electrically conductive material.

13. The energy storage cell of claim 8, further including a cap screw threadably engaged to the external conductor body.

14. The energy storage cell of claim 8, further including a second internal electrical lead connected at a first end to a second one of the electrodes; and a second hermetic electrical terminal in the wall of the pressure vessel, the second hermetic electrical terminal having a second end of the second internal electrical lead connected thereto.

15. The energy storage cell of claim 8, wherein the first threaded engagement is an exterior thread and the second threaded engagement is an interior thread.

16. An electrical terminal mountable to a wall, comprising:

an external electrical conductor exterior to the wall, the external electrical conductor comprising an external conductor body having a first threaded engagement at a first end, and an external shoulder facing the first threaded engagement at a location adjacent to the first threaded engagement, an internal electrical conductor interior to the wall, the internal electrical conductor comprising an internal conductor body having a second threaded engagement at a first end, the second threaded engagement being engagable to the first threaded engagement, an internal shoulder facing the external electrical conductor at a location adjacent to the second threaded engagement, and a mounting structure, comprising a biasing washer overlying the external conductor body and contacting the external shoulder of the external conductor body, a first electrically insulating washer overlying the external conductor body and disposed between the biasing washer and the wall, and a second electrically insulating washer overlying the internal conductor body and disposed between the internal shoulder and the wall of the pressure vessel.

* * * * *